United States Patent [19]

Kanagawa et al.

[11] 4,039,630
[45] Aug. 2, 1977

[54] ELASTOMER

[75] Inventors: Shuichi Kanagawa, Osaka; Kazuyoshi Kagaya, Ibaragi, both of Japan

[73] Assignee: Sumitomo Chemical Company, Limited, Osaka, Japan

[21] Appl. No.: 633,986

[22] Filed: Nov. 20, 1975

[30] Foreign Application Priority Data

Nov. 22, 1974 Japan .................................. 49-134745

[51] Int. Cl.$^2$ ................... C08F 255/06; C08F 279/00; C08F 291/02
[52] U.S. Cl. ............................................... 260/878 R
[58] Field of Search ................................... 260/878 R

[56] References Cited

U.S. PATENT DOCUMENTS

| | | | |
|---|---|---|---|
| 3,970,534 | 7/1976 | Fujiwara et al. | 260/878 R |
| 3,993,714 | 11/1976 | Kanagawa et al. | 260/878 R |

*Primary Examiner*—Alan Holler
*Attorney, Agent, or Firm*—Stevens, Davis, Miller & Mosher

[57] ABSTRACT

A modified elastomer having a phenolic hydroxyl group on the side chain which is excellent in tackiness and in compatibility with other elastomers, characterized in that the elastomer is obtained by graft-copolymerizing an elastomer, prepared by copolymerizing ethylene with at least one α-olefin represented by the general formula R'—CH=CH$_2$, wherein R' is an alkyl group, and at least one non-conjugated diene or polyene, with at least one phenolic monomer represented by the general formula (A),

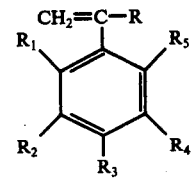

wherein R is a lower alkyl group or a hydrogen atom; and R$_1$ to R$_5$ are individually an alkyl group, a hydrogen atom or a hydroxyl group, one of said R$_1$ to R$_5$ being a hydroxyl group, and wherein the said hydroxyl group may have been protected by an alkyl, acyl or the like group.

11 Claims, No Drawings

ELASTOMER

This invention relates to a new modified elastomer having a phenolic hydroxyl group on the side chain, and a process for producing the same.

Generally, an elastomer consisting of ethylene, an α-olefin and a non-conjugated diene or polyene is well known in this field as EPDM (ethylenepropylene-diene rubber). This elastomer, however, has such essential drawbacks that for final use as a rubber product, it is not only required to be subjected to such complex operation as curing but also is not well processable and curable when mixed with other unsaturated elastomers such as natural rubber, styrenebutadiene rubber, acrylonitrile-butadiene rubber or butadiene rubber. These drawbacks are ascribable to the facts that the elastomer is not only low in unsaturation degree which is inherent due to the structure of the elastomer but also low in polarity, resulting in insufficiency in tackiness. It is known that the said drawbacks encountered at the time of processing can be greatly alleviated by introducing a specific reactive group into the elastomer itself.

In order to overcome the difficulties concerning the insufficient tackiness of said elastomer and the low compatibility thereof with other unsaturated elastomers, various studies have been conducted hitherto. For example, there have been proposed an improvement carried out by graft-copolymerizing the said elastomer with an aromatic vinyl monomer such as styrene or, alkyl-substituted styrene (French Pat. No. 1,427,690); an improvement carried out by producing a terpolymer from ethylene, and α-olefin and an unsaturated carboxylic acid derivative in the presence of a Ziegler type catalyst (U.S. Pat. No. 3,278,495); an improvement carried out by copolymerizing ethylene, an α-olefin and a diene or polyene with an unsaturated aliphatic carboxylic acid derivative or its polar derivative in the presence of an organic metal mixture catalyst (Japanese Patent Publication No. 31707/1972); and an improvement carried out by adding maleic anhydride to the EPDM terpolymer at an elevated temperature (Japanese Patent Application Laid-Open No. 104992/1974). However, there has been proposed no satisfactory process for improving the insufficient tackiness of said elastomer and the low compatibility thereof with other elastomers.

In order to overcome the difficulties concerning the insufficient tackiness of said low polarity elastomer, i.e., as a copolymer consisting of ethylene, an α-olefin and a non-conjugated diene or polyene and the low compatibility of said elastomer with other elastomers, the present inventors have effected extensive studies with an aim to develop an elastomeric copolymer which itself is reactive. As the result, the present inventors have found that a new modified elastomer can be obtained by graft-copolymerizing the said elastomer with a radical polymerizable phenol compound having a specific structure.

Thus, the present invention provides a modified elastomer having a phenolic hydroxyl group on the side chain, characterized in that the elastomer is obtained by graft-copolymerizing an elastomer, prepared by copolymerizing ethylene with at least one α-olefin represented by the general formula $R'-CH=CH_2$, wherein $R'$ is an alkyl group having 1 to 5 carbon atoms, and at least one non-conjugated diene or polyene, with a phenolic monomer represented by the general formula (A),

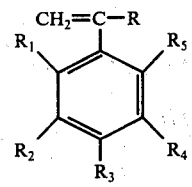

(A)

wherein R is a lower alkyl group having 1 to 4 carbon atoms or a hydrogen atom; and $R_1$ to $R_5$ are individually an alkyl group having 1 to 10 carbon atoms, a hydrogen atom or a hydroxyl group, one of said $R_1$ to $R_5$ being a hydroxyl group, and wherein the said hydroxyl group may have been protected by an alkyl or acyl group or the like, and further provides a process for producing the same, which comprises graft-copolymerizing the elastomer, prepared by copolymerizing ethylene with at least one α-olefin as defined above and at least one non-conjugated diene or polyene, with at least one phenolic monomer as defined above.

The present invention is explained in more detail below.

The phenolic monomer having a specific structure which is used in the process of the present invention is a radical polymerizable phenolic monomer represented by the aforesaid general formula (A). Concrete examples of said monomer include such compounds as m-hydroxystyrene, m-hydroxy-α-methylstyrene, 3-hydroxy-4-methylstyrene, 3-hydroxy-4,6-dimethylstyrene, 3-hydroxy-4-isopropylstyrene, 3-hydroxy-4,6-diisopropylstyrene, 3-hydroxy-4-tert-butylstyrene, 3-hydroxy-4-nonylstyrene, 3-hydroxy-4-methyl-α-methylstyrene, 3-hydroxy-4,6-dimethyl-α-methylstyrene, 3-hydroxy-4-isopropyl-α-methylstyrene, 3-hydroxy-4,6-diisopropyl-α-methylstyrene, 3-hydroxy-4-tert-butyl-α-methylstyrene, 3-hydroxy-4,6-di-tert-butyl-α-methylstyrene, 3-hydroxy-4-nonyl-α-methylstyrene, p-hydroxystyrene, p-hydroxy-α-methylstyrene, 4-hydroxy-3-methylstyrene, 4-hydroxy-3,5-dimethylstyrene, 4-hydroxy-3-isopropylstyrene, 4-hydroxy-3,5-diisopropylstyrene, 4-hydroxy-3-tert-butylstyrene, 4-hydroxy-3-nonylstyrene, 4-hydroxy-3-methyl-α-methylstyrene, 4-hydroxy-3,5-di-methyl-α-methylstyrene, 4-hydroxy-3-isopropyl-α-methylstyrene, 4-hydroxy-3,5-diisopropyl-α-methylstyrene, 4-hydroxy-3-tert-butyl-α-methylstyrene, 4-hydroxy-3,5-di-tert-butyl-α-methylstyrene and 4-hydroxy-3-nonyl-α-methylstyrene. Of these, m-hydroxy monomers (i.e. $R_2$ or $R_4$ in the formula (A) is hydroxy group), particularly, m-hydroxystyrene, m-hydroxy-α-methylstyrene and the like are favorably used because of good stability of the monomer and good graft-polymerization efficiency. These phenolic compounds may be used either singly or in combination of two or more members, and may be protected by alkyl such as methyl and ethyl, acyl such as acetyl or the like such as alkali metals if necessary.

The elastomer to be modified according to the present invention is a compound known under the name EPDM in this field. Examples of the α-olefin are propylene, 1-butene, 1-pentene, 1-hexene and 1-heptene, preferably propylene, and examples of the non-conjugated diene or polyene are alkadienes such as 1,4-hexadiene, 1,5-heptadiene and 2-methylhexadiene-1,5, alkylidene bicycloalkenes such as 5-ethylidene-2-norbornene and 5-methylene-2-norbornene, alkenyl bicycloalkenes such as 5-(1'-propenyl)-2-norbornene, 5-(2'- butenyl)-2-norbornene and 5-hexenyl-2-norbornene, bicycloalkadienes such as dicyclopentadiene and 5-ethyl-2,5-norbornadiene, and alkenyl cycloalkenes such as vinyl cyclohexene.

Examples of the elastomer to be modified include one having an iodine value of at least 3, i.e., ethylene-propylene-dicyclopentadiene, ethylenepropylene-ethylidenenorbornene, and ethylene-propylene-1,4-hexadiene.

The graft-copolymerization of the present invention is carried out according to solution- or bulk-polymerization in the presence or absence of a polymerization initiator at a temperature of 0° to 300° C., preferably 30° to 200° C.

The polymerization initiator to be used in the graft-copolymerization is preferably a conventional radical polymerization initiator, and includes, for example, hydroperoxides such as cumene hydroperoxide and p-menthane hydroperoxide, peracids and esters thereof such as peracetic acid and potassium persulfate, peroxides such as lauryl peroxide and benzoyl peroxide, and azo compounds such as 2,2′-azobisisobutyronitrile. The solvent to be used in the graft-copolymerization according to solution-polymerization is an inert solvent which can dissolve the elastomer and the phenolic monomer but does not react therewith, and includes, for example, aromatic hydrocarbons such as benzene and toluene, aliphatic hydrocarbons such as pentane, n-hexane, heptane, octane, cyclopentane and cyclohexane, halogenated hydrocarbons such as methylene chloride, carbon tetrachloride and perchloroethylene, and ethers such as tetrahydrofuran. In the graft-copolymerization according to bulk-polymerization, it is convenient to adopt a procedure wherein the elastomer, the phenolic monomer and, if necessary, the polymerization initiator are completely mixed together, if desired by use of mixing means such as an open mill or mixer, and then the resulting mixture is heated at a fixed temperature.

The polymerization time varies depending on the prescription, but is ordinarily within at most 48 hours.

The amount of the phenolic monomer is not particularly limited, but is preferably 0.1 to 20 parts, more preferably 0.5 to 10 parts, by weight per 100 parts by weight of the elastomer to be modified.

The thus obtained modified elastomers, which are high molecular weight compounds having phenolic hydroxyl groups on the side chains, are so excellent in tackiness and favorable in compatibility with other unsaturated elastomers as to overcome conventional problems encountered at the time of processing of elastomers. Furthermore, taking advantage of the reactive groups thereof, the modified elastomers are improved in coatability, and further improved to make room temperature curing possible by use of polyfunctional cross-linkers capable of reacting with the phenolic hydroxyl groups, and thus can be used as rubbery adhesives excellent in heat resistance. Particularly when used in the form of latexes, the modified elastomers can effectively be applied to fiber or paper processing or utilized as paints, tackifiers, adhesives and coating agents which are ordinarily usable in the form of latexes.

The present invention is illustrated in further detail below with reference to examples, but the invention is not limited to the examples and various modifications are possible within the scope of the invention. In the examples, all the parts are by weight.

EXAMPLE 1

In a nitrogen-flushed, 2 liter-glass reactor equipped with a stirrer, 100 parts of EPDM ("Esprene EPDM 505", ethylene-propylene-ethylidenenorbornene terpolymer, iodine value 24, Mooney viscosity (100° C) 76, trade name of Sumitomo Chemical Co.) was dissolved in 1,000 parts of toluene, and the resulting solution was sufficiently stirred at 75° C. Subsequently, 2 parts of a 1 : 1 mixture (dilute toluene solution) of azobisisobutyronitrile and benzoyl peroxide as polymerization catalysts was added to the reactor, and sufficiently mixed with the starting material under vigorous stirring at 70° to 80° C. Into the resulting mixture, 5 parts of m-hydroxy-α-methylstyrene (dilute toluene solution) was gradually dropped at 80° C. over a period of about 1 hour by use of a dropping funnel. Thereafter, the mixture was stirred at 80° to 85° C. for 3 hours, and then the toluene was removed by distillation under reduced pressure. The residue was charged into a large amount of methanol to form a bulky polymer, which was then dried at 60° C. to obtain 104 parts of an elastomer. The thus obtained elastomer was reprecipitated from acetone, and then measured in infrared spectrum to confirm the presence of phenolic hydroxyl group. The Mooney viscosity ($ML_{1+4}$) of the elastomer, as measured at 100° C., was 72.

EXAMPLE 2

100 Parts of EPDM ("Esprene EPDM 301", ethylene-propylene-dicyclopentadiene terpolymer, iodine value 10, Mooney viscosity (100° C) 62, trade name of Sumitomo Chemical Co.), 4 parts of a 8 : 2 mixture of m-hydroxy-α-methylstyrene and p-hydroxy-α-methylstyrene, and 1 part of lauryl peroxide were completely mixed together by means of an open roll. The resulting mixture was heated at 80° C. for 6 hours in a nitrogen-flushed dryer, and then unreacted hydroxy-α-methylstyrenes and homopolymers were removed by extraction with acetone to obtain 103.2 parts of an elastomer. The infrared spectrum of the thus obtained elastomer was measured to confirm the presence of phenolic hydroxyl group. The Mooney viscosity ($ML_{1+4}$) of the elastomer, as measured at 100° C., was 58.

EXAMPLE 3

In a nitrogen-flushed, 2 liter-glass reactor equipped with a stirrer, 100 parts of EPDM ("Esprene EPDM 505", the same as in Example 1) was dissolved in 2,000 parts of n-hexane. Subsequently, 1 part of a 1 : 1 mixture (dilute toluene solution) of azobisisobutyronitrile and lauryl peroxide as polymerization catalysts was added to the reactor, and sufficiently mixed with the starting material under vigorous stirring at 65° to 68° C. Into the resulting mixture, 2 parts of 4-hydroxy-3,5-diisopropylstyrene (dilute n-hexane solution) was gradually dropped at 69° C. over a period of about 30 minutes by use of a dropping funnel. Thereafter, the mixture was stirred at 69° to 70° C. for 5 hours, and then the n-hexane and the toluene were removed by distillation under reduced pressure. The residue was charged into a large amount of acetone to form a bulky polymer, which was then dried at 60° C. to obtain 101.2 parts of an elastomer. The infrared spectrum of the thus obtained elastomer was measured to confirm the presence of phenolic hydroxyl group. The Mooney viscosity ($ML_{1+4}$) of the elastomer, as measured at 100° C., was 70.

What is claimed is:

1. A modified elastomer having a phenolic hydroxyl group on the side chain, characterized in that the elastomer is obtained by graft-copolymerizing an elastomer, prepared by copolymerizing ethylene with at least one α-olefin represented by the general formula R'—CH=CH$_2$, wherein R' is an alkyl group, and at least one non-conjugated diene or polyene, with at least one phenolic monomer represented by the general formula (A),

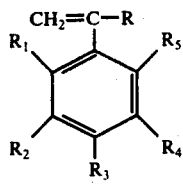

wherein R is a lower alkyl group or a hydrogen atom; and R$_1$ to R$_5$ are individually an alkyl group, a hydrogen atom or a hydroxyl group, one of said R$_1$ to R$_5$ being a hydroxyl group, and wherein the said hydroxyl group may have been protected by an alkyl or acyl group or an alkalimetal.

2. The modified elastomer according to Claim 1, wherein the phenolic monomer is m-hydroxystyrene, m-hydroxy-α-methylstyrene, 3-hydroxy-4-methylstyrene, 3-hydroxy-4,6-dimethylstyrene, 3-hydroxy-4-isopropylstyrene, 3-hydroxy-4,6-diisopropylstyrene, 3-hydroxy-4-tert-butylstyrene, 3-hydroxy-4,6-di-tert-butylstyrene, 3-hydroxy-4-nonylstyrene, 3-hydroxy-4-methyl-α-methylstyrene, 3-hydroxy-4,6-dimethyl-α-methylstyrene, 3-hydroxy-4-isopropyl-α-methylstyrene, 3-hydroxy-4,6-diisopropyl-α-methylstyrene, 3-hydroxy-4-tert-butyl-α-methylstyrene, 3-hydroxy-4,6-di-tert-butyl-α-methylstyrene, 3-hydroxy-4-nonyl-α-methylstyrene, p-hydroxystyrene, p-hydroxy-α-methylstyrene, 4-hydroxy-3-methylstyrene, 4-hydroxy-3,5-dimethylstyrene, 4-hydroxy-3-isopropylstyrene, 4-hydroxy-3,5-diisopropylstyrene, 4-hydroxy-3-tert-butylstyrene, 4-hydroxy-3-nonylstyrene, 4-hydroxy-3-methyl-α-methylstyrene, 4-hydroxy-3,5-dimethyl-α-methylstyrene, 4-hydroxy-3-isopropyl-α-methylstyrene, 4-hydroxy-3,5-diisopropyl-α-methylstyrene, 4-hydroxy-3-tert-butyl-α-methylstyrene, 4-hydroxy-3,5-di-tert-butyl-α-methylstyrene, 4-hydroxy-3-nonyl-α-methylstyrene, or a mixture thereof.

3. The modified elastomer according to claim 1, wherein the phenolic monomer is used in a proportion of 0.1 to 20 parts by weight per 100 parts by weight of the elastomer.

4. The modified elastomer according to claim 1, wherein the α-olefin is propylene, 1-butene, 1-pentene, 1-hexene or 1-heptene.

5. The modified elastomer according to claim 1, wherein the non-conjugated diene or polyene is 1,4-hexadiene, 1,5-heptadiene, 2-methylhexadiene-1,5,5-ethylidene-2-norbornene, 5-methylene-2-norbornene, 5-(1'-propenyl)-2-norbornene, 5-(2'-butenyl)-2-norbornene, 5-hexenyl-2-norbornene, dicyclopentadiene, 5-ethyl-2,5-norbornadiene or vinyl cyclohexene.

6. The modified elastomer according to claim 1, wherein the copolymerization is effected according to solution- or bulk-polymerization.

7. The modified elastomer according to claim 1, wherein the copolymerization is effected in the presence or absence of a polymerization initiator at a temperature of 30° to 200° C.

8. The modified elastomer according to claim 7, wherein the polymerization initiator is a hydroperoxide, a peracid, an ester of peracid, a peroxide, an azo compound, or a mixture thereof.

9. The modified elastomer according to claim 6, wherein the solvent used in the solution-polymerization is an inert solvent which can dissolve the elastomer and the phenolic monomer but does not react therewith.

10. The modified elastomer according to claim 6, wherein the bulk-polymerization is effected by completely mixing the elastomer, the phenolic monomer and if desired the polymerization initiator by means of an open mill or mixer, and then heating the resulting mixture.

11. A process for producing an elastomer having a phenolic hydroxyl group on the side chain, characterized by graft-copolymerizing an elastomer, prepared by copolymerizing ethylene with at least one α-olefin represented by the general formula R'—CH=CH$_2$, wherein R' is an alkyl group, and at least one non-conjugated diene or polyene, with at least one phenolic monomer represented by the general formula (A),

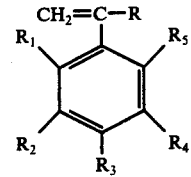

wherein R is a lower alkyl group or a hydrogen atom; and R$_1$ to R$_5$ are individually an alkyl group, a hydrogen atom or a hydroxyl group, one of said R$_1$ to R$_5$ being a hydroxyl group, and the said hydroxyl group may have been protected by an alkyl or acyl group or an alkali metal.

* * * * *